(12) United States Patent
Storm

(10) Patent No.: US 7,647,907 B2
(45) Date of Patent: Jan. 19, 2010

(54) INDUCTION DRIVEN IGNITION SYSTEM

(75) Inventor: John M. Storm, Danville, IN (US)

(73) Assignee: Contour Hardening, Inc., Indianapolis, IN (US)

( * ) Notice: Subject to any disclaimer, the term of this patent is extended or adjusted under 35 U.S.C. 154(b) by 0 days.

(21) Appl. No.: 12/252,719

(22) Filed: Oct. 16, 2008

(65) Prior Publication Data

US 2009/0050122 A1    Feb. 26, 2009

Related U.S. Application Data

(63) Continuation-in-part of application No. 11/951,875, filed on Dec. 6, 2007, now Pat. No. 7,533,643.

(60) Provisional application No. 60/873,359, filed on Dec. 7, 2006.

(51) Int. Cl.
*F02P 23/04* (2006.01)

(52) U.S. Cl. .................. 123/143 B; 123/145 A; 123/149 A; 123/162

(58) Field of Classification Search .......... 123/14 R, 123/145, 149 A, 162, 143 B
See application file for complete search history.

(56) References Cited

U.S. PATENT DOCUMENTS

| | | |
|---|---|---|
| 2,456,080 A | 12/1948 | Pe |
| 2,617,841 A | 11/1952 | Linder |
| 3,693,607 A | 9/1972 | Pasbrig |
| 4,138,980 A | 2/1979 | Ward |
| 4,297,983 A | 11/1981 | Ward |
| 4,300,512 A | 11/1981 | Franz |
| 4,439,707 A | 3/1984 | Hattori et al. |
| 4,446,826 A | 5/1984 | Kimura et al. |
| 4,522,185 A | 6/1985 | Nguyen |
| 4,625,681 A | 12/1986 | Sutekiyo |
| 4,808,878 A | 2/1989 | Kashiwara et al. |
| 4,851,732 A | 7/1989 | Kashiwara et al. |
| 4,914,343 A | 4/1990 | Kagawa et al. |
| 5,056,497 A | 10/1991 | Akagi et al. |

(Continued)

FOREIGN PATENT DOCUMENTS

WO    WO 97/21920    6/1997

(Continued)

OTHER PUBLICATIONS

Written Opinion of the International Searching Authority, U.S.P.T.O., Jul. 28, 2008.

(Continued)

*Primary Examiner*—Erick Solis
(74) *Attorney, Agent, or Firm*—Woodard, Emhardt, Moriarty, McNett & Henry LLP

(57) ABSTRACT

An induction driven ignition system with an electrode projecting into the combustion chamber of a reciprocating internal combustion engine. The electrode is adjacent to but electrically insulated from an electrical conductor which receives current at frequencies between 100 kHz to 500 kHz. Thermal insulation is also provided between the electrode and adjacent structure of the head. The induction driven ignition system causes the electrodes to rapidly and accurately heat up to very high temperatures. The electrodes may be formed in elongated edges throughout the combustion chamber to provide combustion initiation over a wide area.

14 Claims, 15 Drawing Sheets

U.S. PATENT DOCUMENTS

| | | |
|---|---|---|
| 5,297,510 A | 3/1994 | Turkowski |
| 5,590,629 A | 1/1997 | Codina et al. |
| 5,649,507 A | 7/1997 | Gregoire et al. |
| 5,767,613 A | 6/1998 | Kunt |
| 5,831,376 A | 11/1998 | Ho et al. |
| 5,913,960 A | 6/1999 | Fletcher-Jones |
| 5,979,399 A | 11/1999 | Plock et al. |
| 5,983,871 A | 11/1999 | Gordon et al. |
| 6,152,095 A | 11/2000 | Ripma et al. |
| 6,414,419 B1 | 7/2002 | Kim |
| 6,700,105 B2 | 3/2004 | Morrison |
| 6,883,507 B2 | 4/2005 | Freen |
| 7,036,476 B2 * | 5/2006 | Wintner et al. .......... 123/143 B |
| 7,182,076 B1 | 2/2007 | Minker |
| 7,182,077 B2 * | 2/2007 | Ward .......................... 123/634 |
| 7,204,220 B2 | 4/2007 | Schmidt et al. |
| 2002/0079799 A1 | 6/2002 | Yang |
| 2005/0215160 A1 | 9/2005 | Kolp |
| 2007/0240660 A1 | 10/2007 | Gallatz et al. |
| 2009/0194051 A1 * | 8/2009 | Smith et al. ............. 123/143 B |

FOREIGN PATENT DOCUMENTS

WO  WO 2005/059356  6/2005

OTHER PUBLICATIONS

Preliminary Report on Patentability, PCT/US07/86733, Jul. 22, 2009.

* cited by examiner

INDUCTION DRIVEN IGNITION SYSTEM

CROSS REFERENCE TO RELATED APPLICATIONS

The present application is a continuation-in-part of U.S. application Ser. No. 11/951,875, filed on Dec. 6, 2007, now U.S. Pat. No. 7,533,643 which claims the benefit of U.S. Provisional Patent Application Ser. No. 60/873,359, filed Dec. 7, 2006, with said priority applications being incorporated herein by reference in their entirety.

FIELD OF THE INVENTION

The present invention relates to the field of ignition sources and more particularly to ignition sources used in internal combustion engines.

BACKGROUND OF THE INVENTION

In the field of internal combustion engines, especially the reciprocating type, a measured quantity of fuel and air is compressed and ignited either by an external ignition source or by the heat of compression. The engine in which the air/fuel mixture is ignited by the heat of compression is commonly called a diesel engine. It utilizes a system where the air for combustion is compressed to an elevated temperature sufficiently high to ignite the fuel supplied from a fuel injection source. Such fuel injection source is typically an injector having a tip exposed to the combustion chamber and which sprays fuel in discrete streams. The fuel injector injects the fuel either in a radiating pattern from a central location or in a given direction to promote mixing by swirl of the combustion chamber air. However, in either case, the injection of fuel and the resultant initiation of combustion is begun substantially at or adjacent a point.

Recent developments in the field of homogenous charge compression ignition engines have proposed injecting fuel into the intake air prior to compression and using various schemes to ignite the resultant mixture. Such proposal usually involves a point ignition source such as a sparkplug.

By far the most common engine type on the road is the spark ignited gasoline engine. The gasoline engine was first developed in the latter part of the 19$^{th}$ Century and has since been employed widely for powering passenger vehicles owing to its relatively quiet operation and starting ease. With the advent of increasing energy prices and customer demand, the spark ignition engine is being asked to do significantly more than it was in prior years. Gasoline engine developments have, for the most part, focused on carrying a maximum flow of air efficiently into the combustion chamber and exhausting the products of combustion after the combustion event occurs. Developments like multiple valves, tuned intake systems, variable geometry intake systems, and positive charging of the intake charge by a turbocharger or supercharger are common approaches used to try and improve air flow.

Correspondingly, the fuel system has evolved and developed through the use of injectors. The injectors have been electronically controlled to vary the quantity and timing to produce highly flexible injection of fuel into the mixture for combustion. Additional proposals have been made for injecting fuel directly into the combustion chamber similar to a system mechanically implemented on early Mercedes Benz sports cars.

Recently, biofuels have been proposed that use various forms of ethanol or methanol from grain crops thereby providing a renewable resource. Such fuels offer the advantage of high octane ratings so that higher compression ratios may be easily handled within the combustion chamber. They also permit a significant reduction in emissions. However, one drawback with fuels of this type is the slow propagation of the flame front making it necessary for ignition timing to be well in advance of top dead center (TDC) to be sure all of the mixture is combusted. This in turn reduces efficiency as the combustion pushes in one direction against the piston that is moving in the opposite direction as it moves toward TDC.

The sparkplug is a common igniter used to initiate combustion of a fuel air mixture in a spark ignition engine. Various developments over the years have increased the energy passing across the spark gap so that it more efficiently promotes combustion. In addition, some inventors have suggested enhancing the ignition by subjecting the spark gap to electromagnetic forces to, in effect, widen the area over which combustion is initiated.

However, most of these approaches still suffer from the limitation that they are in fact point, or near point, initiators of combustion.

Another problem exists related to diesel engines and their inability to start in cold weather. As noted above, a diesel engine utilizes the heat of compression to ignite the air/fuel mixture in the combustion chamber. However, when the cylinder head and cylinder block are cold, they serve as a heat sink, absorbing a portion of the heat generated by the compression. Currently, glow plugs are utilized to heat the engine block and surrounding cylinders. Because glow plugs are essentially resistive loads that emit heat when a current is run through them, the pre-heating process can take some time: up to 20 seconds. Therefore, there exists a need for quicker and more efficient heating of diesel engine blocks in cold weather conditions.

BRIEF SUMMARY

The present invention utilizes the rapid heat rise associated with metals entering a strong electromagnetic field. One embodiment of the present invention goes beyond a single source ignition device through the use of extremely rapid and accurately controlled induction heating for a heat source that is unrestrained by conventional point ignition principles. The induction driven heat source offers a wide selection of its geometry so that it can be deployed throughout the combustion chamber. This permits the flame front to be expanded because there are multiple ignition sources or locations. In another embodiment, the induction driven heat source enables quick and efficient start-up of diesel engines in low temperature conditions.

DETAILED DESCRIPTION

Figure 1A:
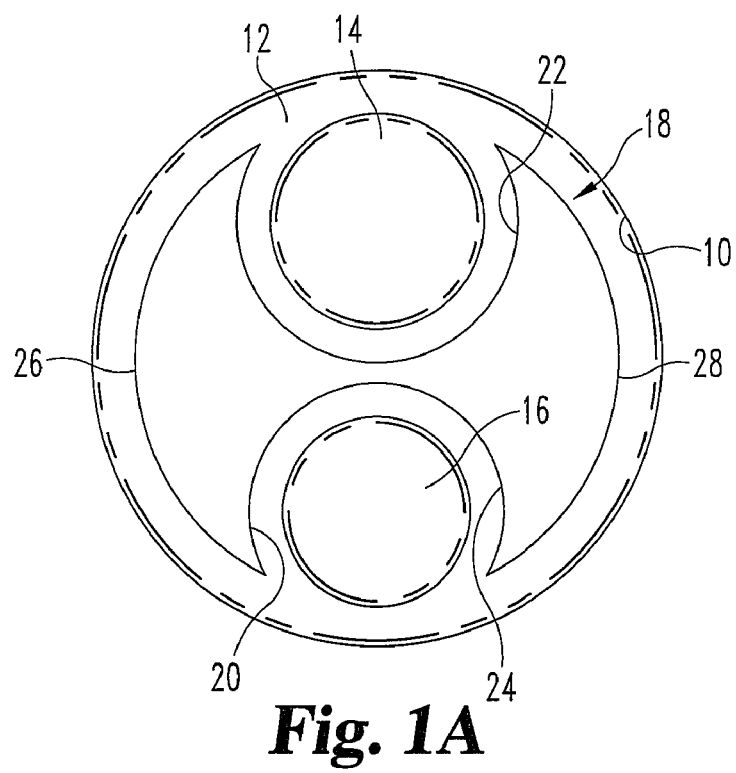
FIG. 1A is a top plan view of an engine combustion chamber incorporating one embodiment of an ignition initiation system.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

FIG. 1A shows an example of a typical combustion chamber configuration wherein the chamber 10 is defined by a cylinder head 12 having an intake valve 14 and an exhaust valve 16 to respectively admit a combustible mixture and to exhaust the motive fluid after the mixture has gone through combustion. The process of combustion transfers heat energy in the form of tangential force to a piston (not shown) connected to a crank shaft to produce a rotary output. The tangential force is created by an induction driven combustion initiator, generally indicated by reference number 18, which will be discussed in detail below. However, for purposes of this early discussion, the combustion ignition device 18 comprises a series of edges 20 continuously extending through a selected region of the chamber 10. Combustion initiation edges 20 have center sections 22 and 24, which curve around the intake and exhaust valves, 14 and 16, respectively. Center sections 22 and 24 are connected to semi circular edges 26 and 28. It should be noted in FIG. 1A that the combustion ignition device 18 extends over a substantial area of the combustion chamber 10.

Figure 1B:
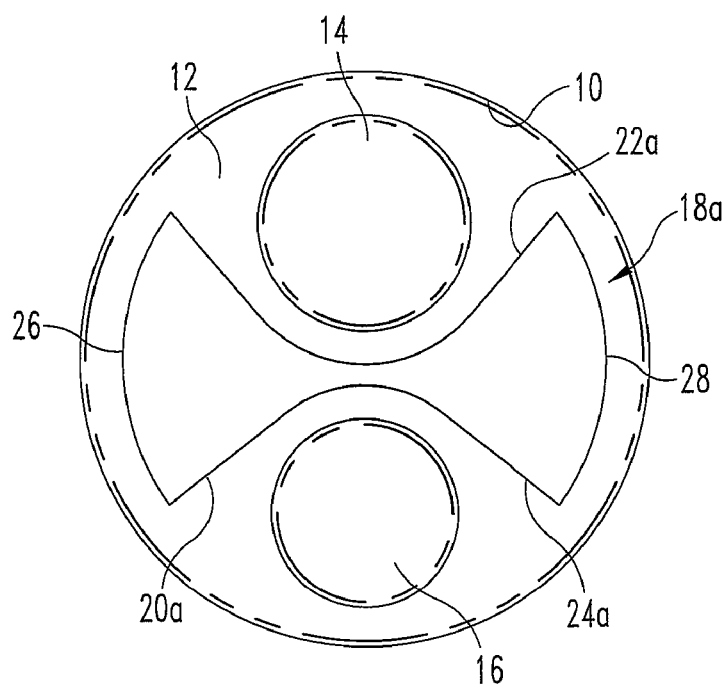
FIG. 1B is a top plan view of an engine combustion chamber incorporating another embodiment of an ignition initiation system.

FIG. 1B shows an example of another combustion initiator 18a that is arranged relative to the combustion chamber configuration illustrated in FIG. 1A, according to the present disclosure. The edge shape of initiator 18a has been changed from what is illustrated in FIG. 1A and the "a" suffix is used to denote similarly located and/or functioning sections. Circular edges 26 and 28 remain the same.

Figure 2:
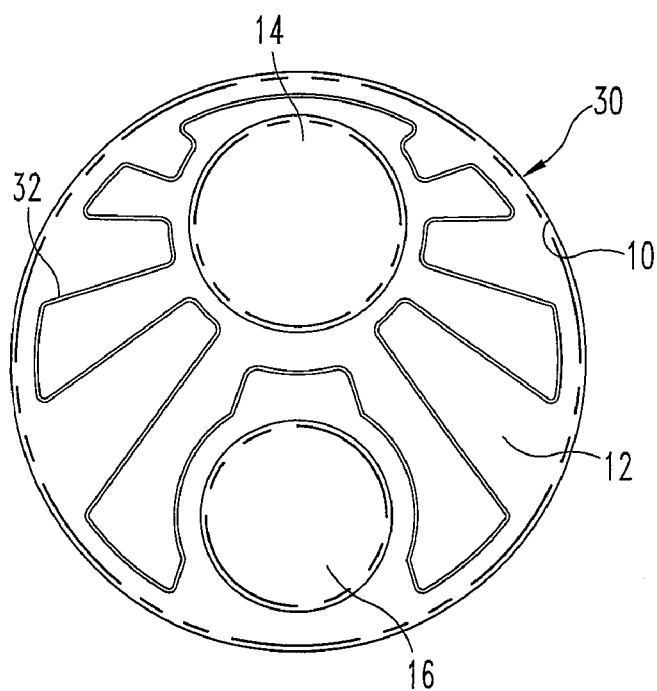
FIG. 2 is a top plan view of an engine combustion chamber incorporating an alternative embodiment of an ignition initiation system.

FIG. 2 shows a further refinement of a combustion initiation device generally indicated by reference number 30 having a continuous curvilinear edge 32 extending over an even greater area of the combustion chamber 10. Thus, the combustion process is freed from point sources of ignition and the resultant unpredictability of the combustion process. This allows exploration and use of air/fuel ratios higher than stoichiometric (14.7 to 1) to achieve significantly increased efficiencies. In addition, this technology allows for greater potential efficiency gains and less complex execution methods than homogeneous charge compression ignition engines. It is apparent that many different configurations to the ignition initiation devices 18, 18a and 30 can be employed to adapt to a particular combustion chamber geometry.

Figure 3:
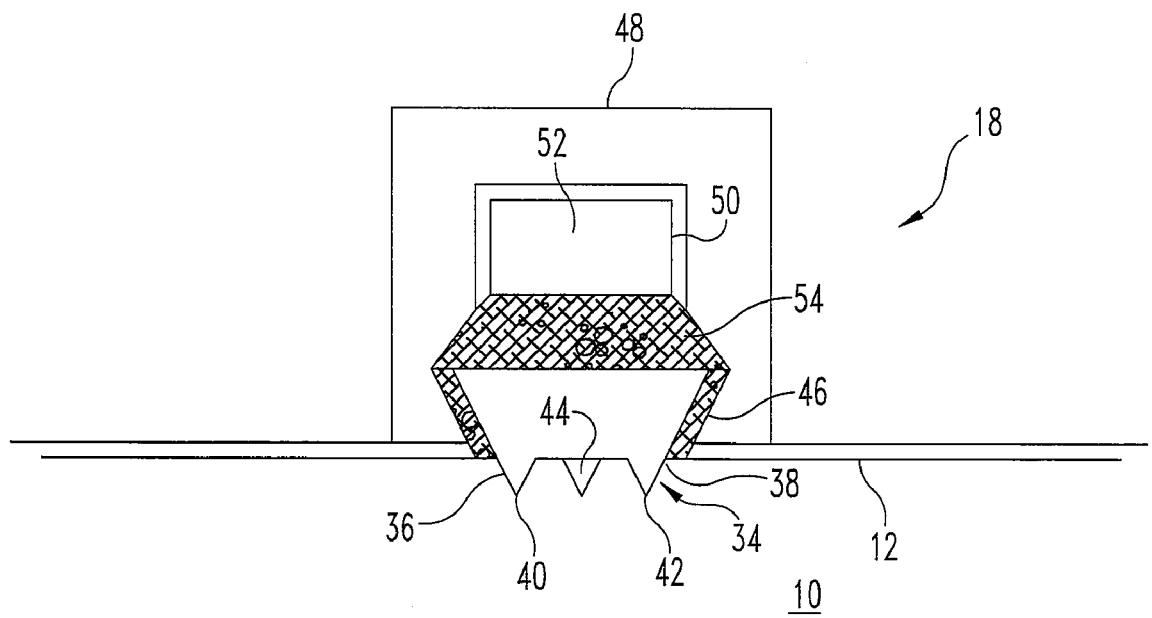
FIG. 3 is a cross sectional view of one design option for the ignition initiation systems of FIGS. 1A, 1B & 2.

FIG. 3 shows the cross-sectional configuration of one of the possible combustion initiators 18 and 18a according to this disclosure. Combustion initiators 18 and 18a each comprise an electrode, generally indicated by reference number 34. It should be noted that several principles are employed to increase the efficiency and speed at which the electrode 34 is heated up. Electrode 34 is mounted so as to project below the cylinder head 12 and into the combustion chamber 10. Electrode 34, as shown herein, comprises, by way of example, 400 series stainless steel in a relatively thin wall configuration. This type of stainless steel is selected because it is less expensive than other materials and can go through hundreds of millions of thermal heating and cooling cycles while still retaining its structural integrity. It should be apparent to those skilled in the art that other materials may be employed for this purpose, for example, platinum and palladium or other alloy compounds.

Electrode 34 is formed with converging sidewalls 36 and 38 terminating at tips 40 and 42 which produce a substantial heat rise and density of heat. Tips 40 and 42 are interconnected by center section 44. The tips 40 and 42 are intended to have a relatively small surface area with sharp corners exposed to the combustion chamber 10. It should be apparent to those skilled in the art that single tips as shown in FIGS. 1A, 1B, and 2 or multiple tips may be employed to further increase the surface area as needed. The electrode 34 is retained within the cylinder head 12 by thermal insulation 46. The electrode 34 extends into a housing 48 that mounts the electrode 34, in addition to concentrating the magnetic flux by reflecting all incident radiation. A preferred material for the housing is called Fluxtrol® comprised of soft magnetic composites made of magnetic powdered metal and dielectric binders. Other materials may be employed for this purpose, such as ceramics, synthetic polymers and any other dialetric materials capable of withstanding the surrounding environment. In effect, what the housing 48 does is to concentrate magnetic flux through the electrode 34. This is done to maximize the rate at which the electrode heats up and to minimize the amount of residual induction heating of the cylinder head 12.

Contained within chamber 50 in housing 48 is a current conducting bar 52, preferably formed from copper. An electrical insulating material 54 is positioned between the bar 52 and electrode 34. Current is induced through bar 52 at a frequency that is appropriate to generate significant temperature rise within the electrode 34. The frequency can range between 100 kHz to 500 kHz with 250 to 450 kHz preferred but other frequencies are appropriate. With higher frequencies, surface specific currents are induced in the bar 52, causing a rapid build up in temperature along the sharp edge of the electrode which can reach operating temperatures within as fast as 0.015 second.

The current passing through the bar 52 is generated by an appropriate electrical system, not shown to simplify and focus on an understanding of the invention. It should be apparent to those skilled in the art that available high frequency current generators found in the induction heating art can be employed for this purpose. In one embodiment, a variable power supply may be utilized. In this embodiment, a higher power may be outputted during starting conditions. Once steady state is reached, a lower power may then be outputted. By incorporating the use of a variable power supply, the system can take advantage of the residual heat surrounding the combustion area and, therefore, become more efficient.

The ability to initiate combustion over a broad surface area is especially advantageous when burning fuel that is 15 percent gasoline and 85 percent alcohol because of its slower flame front necessitating a significant advance in timing for a point source ignition device. The ability to initiate combustion over a broad area of the combustion chamber allows a lower ignition advance and more predictable combustion.

The construction of the electrode 34 and its positioning within the cylinder head 12 may take many different forms. However, certain elements are necessary. For example, the conductive material needs to be electrically insulated from the electrode material, the electrode itself needs to be thermally insulated from the surrounding combustion chamber and finally, the magnetic field generated by passing current at a high frequency through the conductor should be channeled and focused into the electrodes. In connection with thermal insulation, insulating material may be employed between the head and the electrode structure. Depending on the materials used, it may be also necessary and appropriate to provide active cooling of the electrically conductive material through the use of coolant passages either through or adjacent the electrically conductive element.

The configuration shown in FIGS. 1A, 1B, 2, and 3 shows an induction driven ignition system wherein the electrodes and electrical conductor are positioned on the non-moving structure of the engine. In those arrangements, the timing of the ignition event is driven electronically through an external control system. The arrangements shown in FIGS. 4, 5 and 6 have a design wherein the electrical conduction and the electrode are formed on two separate components, namely the head structure and the piston crown. This design is especially advantageous for engines that run at substantially constant conditions as in a hybrid-drive vehicle or a generator set.

Figure 4:
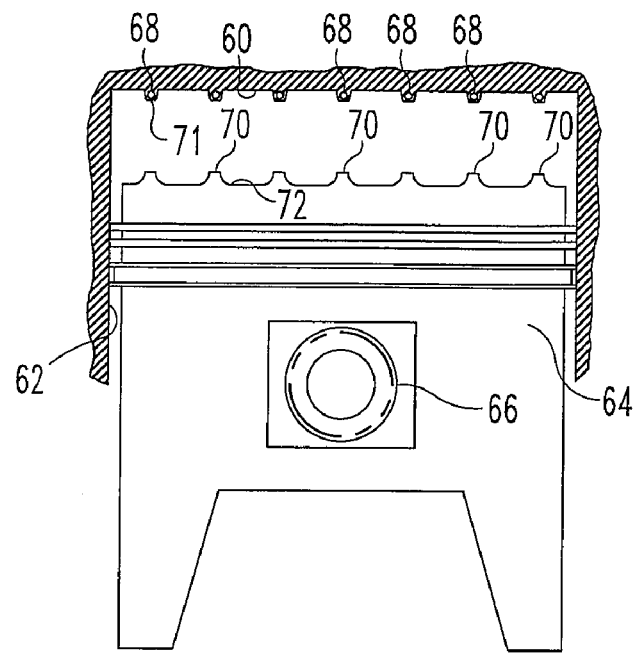
FIG. 4 is a front elevation view in partial section of an alternative ignition initiation system.

In the arrangement of FIG. 4, a head 60 has a cylindrical chamber 62 extending from it in which a piston 64 is positioned for reciprocating motion. Piston 64 has a wrist pin 66 for journaling a connecting rod (not shown) to convert the reciprocating motion of piston 66 to rotary motion at the output of a crank shaft.

Head 60 has current conducting elements 68 through which a high frequency electrical voltage is passed as in element 52 of FIG. 3. Furthermore, the electrically conductive elements 68 are electrically insulated and thermally insulated from the other elements of the head 60. Electrical and thermal insulation can take the form shown in FIG. 3. An appropriate housing can be employed to channel the electromagnetic field in a region extending into cylinder 62. As shown in FIG. 4, current conducting elements 68 are positioned within housings 71 that project into chamber 62.

Piston 64 has a plurality of raised elements 70 on its crown 72. Raised elements 70 correspond with the housings 71 for electrically conductive elements 68 which project into the cylinder such that the closest point of potential contact between the piston 64 and the head 60 is between the housings 71 for the electrically conductive elements 68 and raised elements 70. As illustrated in FIGS. 1 and 2, raised elements 70 can be provided in any one of a number of geometric patterns to provide an appropriate widespread initiator of combustion. The high frequency alternating voltage is generated through element 68 and when the raised elements 70 come closely adjacent, they are heated through electromagneticly induced current flow and thus provide a widespread heated source to initiate combustion. Typically the elements 70 heat up when the piston crown 72 is displaced to the point where there is approximately 1 mm between the electrically conductive element 68 and the raised elements 70. Although this limits the variability of ignition timing, it is appropriate and acceptable for those engines having substantially constant running conditions as in a generator set or hybrid vehicle. Because the piston has greater mass and due to backface oil cooling opportunities, the design of FIG. 4 offers additional opportunities for any thermal dispersion since the elements 70 are disconnected from the head and on the piston.

Figure 5:
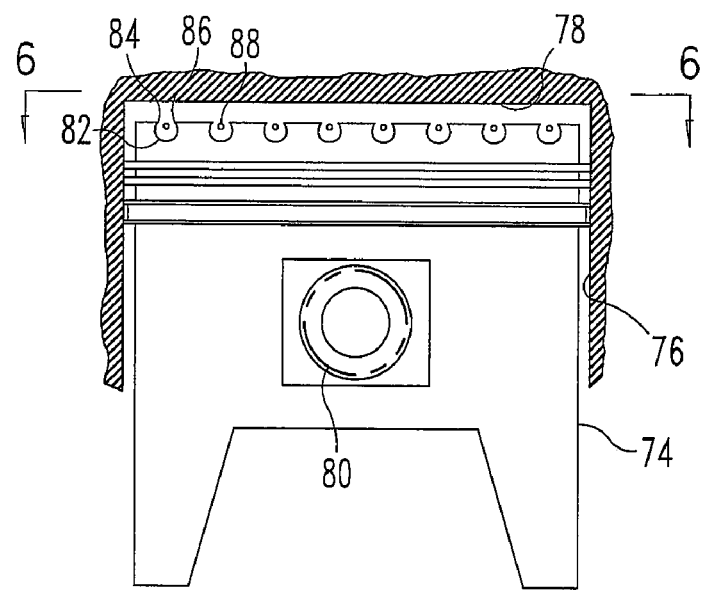
FIG. 5 is a front elevation view in partial section of an engine combustion chamber incorporating another embodiment of an ignition initiation system.
Figure 6:
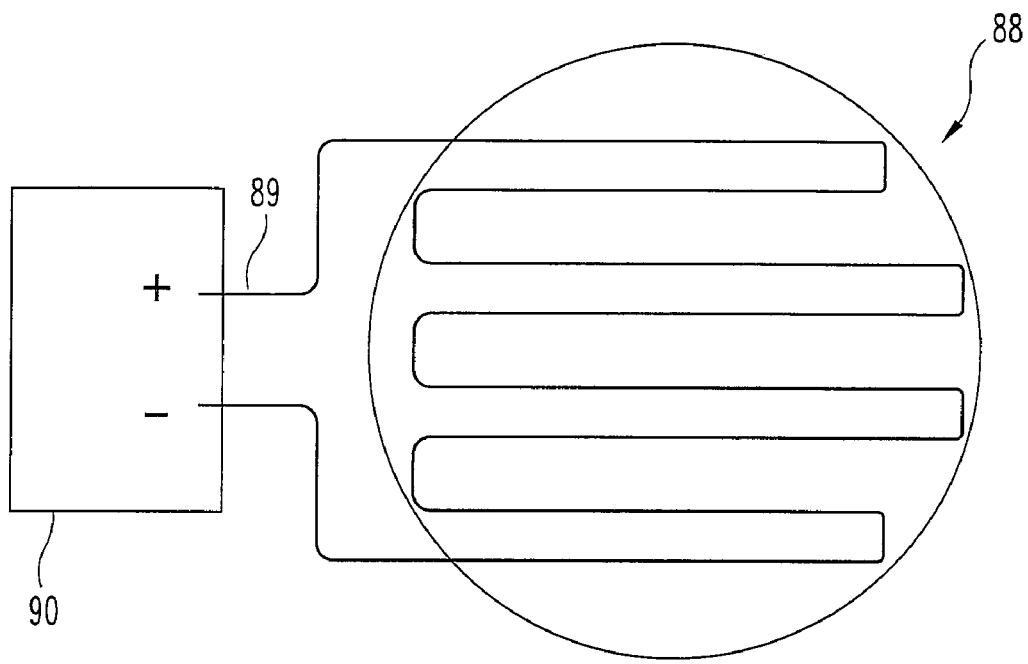
FIG. 6 is a cross sectional view of FIG. 5 as taken on lines 6-6 of FIG. 5.

FIGS. 5 and 6 show an alternative configuration to that shown in FIG. 4. In FIG. 5, a piston 74 is displaceable in a cylinder 76 to form a combustion chamber relative to a head 78. Piston 74 is reciprocal so that it translates linear movement through a wrist pin 80 to a crankshaft (not shown) to produce rotary output. It should be apparent to those skilled in the art that intake and exhaust valves can be provided in the head 78 to allow entry of a combustible mixture and exhaust of the mixture so ignited. Piston 74 has a plurality of grooves 82 that terminate with relatively sharp edges 84 and 86. The head and cylinder 76 are adapted to receive a coil 88 which extends through grooves 82 in line with sharp edges 84 and 86 when the piston 74 is at or near top dead center. Wire 89, as shown in FIG. 6, is connected to a source of electrical energy generally indicated by reference number 90. This can be a power supply providing high frequency current to coil 88 at approximately 300 kHz. As shown in FIG. 6, coil 88 has a continuous circuitous length extending through grooves 82 to match the contours to align with the sharp edges 84 and 86. There are appropriate insulating supports to maintain coil 88 aligned with the sharp edges 84 and 86 of grooves 82. It should be noted that this system, like the system of FIG. 4, is dependent upon the physical position of the piston relative to the head 78. Consequently, this configuration is appropriate for engine systems having relatively constant operating conditions, such as in a hybrid vehicle. This system uses the top of the piston as the electromagnetic load and, in that context, the piston needs to have a ferrous component so that it will react to the high frequency current. It provides the benefits of simple coil geometry and no external timing system.

Figure 7:
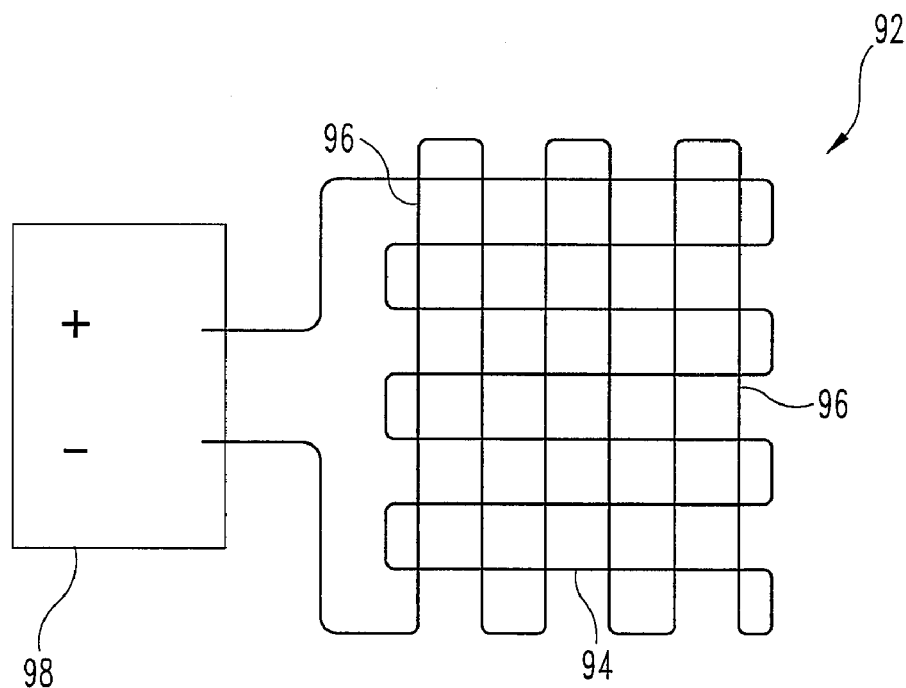
FIG. 7 is a top plan view of an alternative coil arrangement.

FIG. 7 shows an alternative coil pattern wherein a coil, generally indicated by reference character 92, has a lattice-work of wires 94 and 96 intersecting one another at right angles. A power source 98 supplies the wire with current. For example, power source 98 may supply the current on a high frequency basis of approximately 300 kHz at approximately 2.5 kW-6.0 kW power level. As previously noted, the frequency can range between 100 kHz to 500 kHz with 250 kHz to 450 kHz preferred but other frequencies may be appropriate. Similarly, though power levels of 2.5-6.0 kW may be preferred, other power levels may be appropriate based on the working conditions of the system. In this embodiment, the piston crown or top would have a series of lattice-work grooves to provide the appropriate relatively close clearance when the piston is at or near top dead center.

Figure 8:
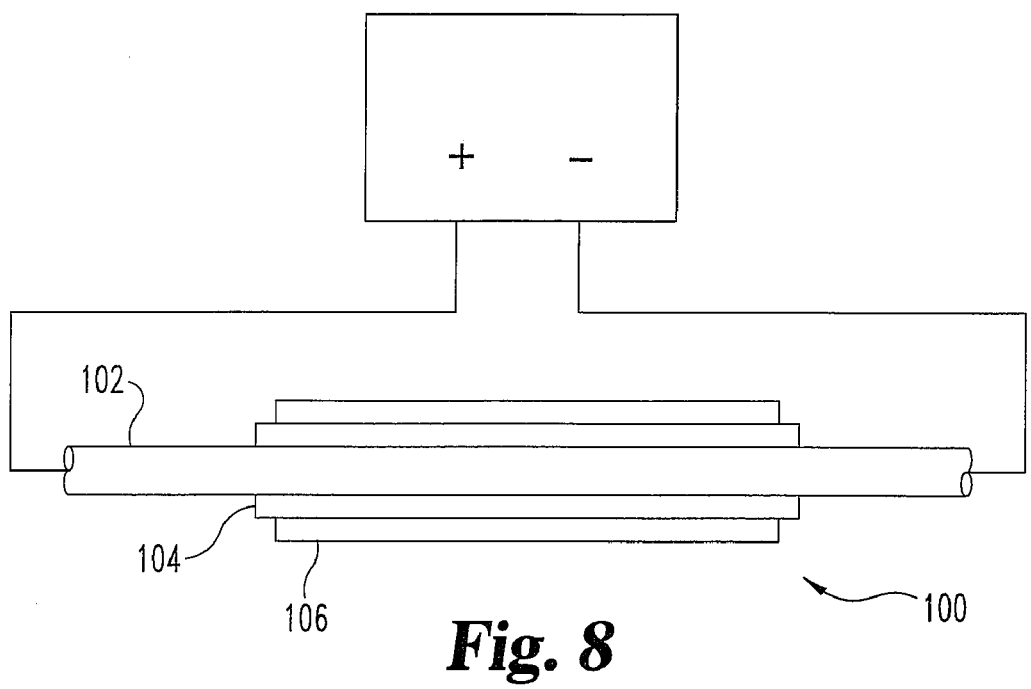
FIG. 8 is a side elevation view of another alternative coil arrangement.
Figure 9:
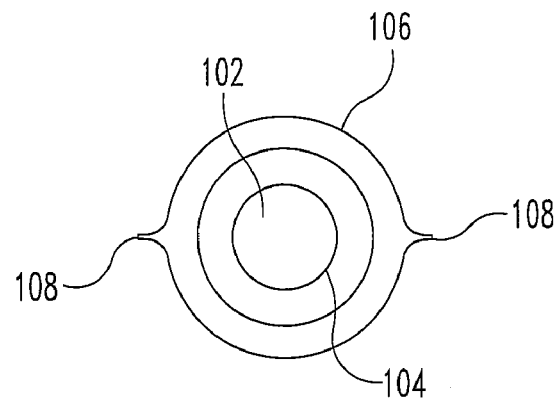
FIG. 9 is a cross sectional view of FIG. 8.

FIGS. 8 and 9 show still another version of the coil that permits it to be self-contained and able to generate the rapid temperature rises indicated in connection with the discussion of FIGS. 1-4. FIGS. 8 and 9 show a coil assembly generally indicated by reference number 100 having a conductor 102, annular electrical insulation 104, and a sheath 106 contributing the magnetic load. This can be formed from appropriate material having magnetic properties. As shown in FIG. 9, the cross section of the sheath 106 has sharp ridges 108 running generally parallel with respect to the conductor 102. In this case, when high frequency electrical current is passed through the conductor 102, the sharp edges 108 will glow with the heat during the power-on cycle and thus promote combustion. Such a device can be employed in hybrid vehicles where there is a relative constant RPM engine with multiple sources of stored energy.

Figure 10:
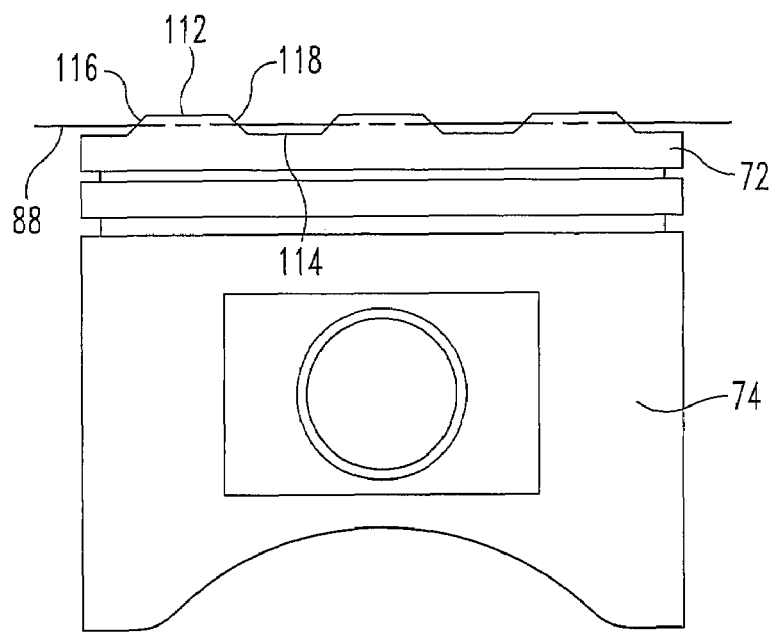
FIG. 10 is a side elevation view of a design option for piston crown for use with a ignition initiation system of the present disclosure.
Figure 11A:
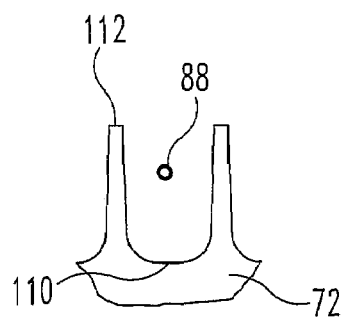
FIG. 11A is a cross sectional view of the upper ridge design of FIG. 10.
Figure 11B:
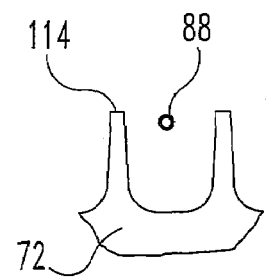
FIG. 11B is a cross sectional view of the lower ridge design of FIG. 10.

FIGS. 10-13 illustrate alternative piston crown 74 configurations to be used with coil 88 of FIG. 6. As shown in FIGS. 10, 11A and 11B, a plurality of high ridges 112 and a plurality of low ridges 114 are cast into piston crown 72. Similar to the piston design depicted in FIG. 5, the arrangement of high ridges 112 and low ridges 114 is such that coil 88 will enter groove 110 when piston 74 is at or near top dead center. As illustrated, angled ridges 116 and 118 connect high ridges 112 and low ridges 114. As current is supplied to coil 88 and piston 74 nears top dead center, there is an intermittent exposure of mass to the magnetic flux field. This intermittent exposure results in a quicker heat rise than with a constant ridge design. As should be appreciated by those of ordinary skill, the increase heat rise is due to the concentration of electromagnetic field intensity near the edges present in piston crown 74, resulting in a greater current density at the edges.

Figure 12:
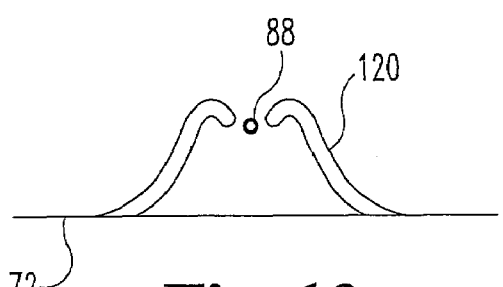
FIG. 12 is front elevation view of an alternative piston crown design for use with an ignition initiation system of the present disclosure.
Figure 13:
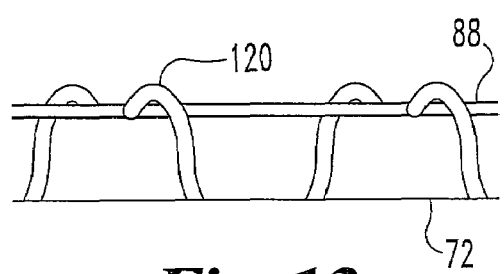
FIG. 13 is a side elevation view of the alternative piston crown design of FIG. 12.

The same principle applies to the embodiment shown in FIGS. 12 and 13. In this embodiment, instead of alternating high and low ridges, raised targets 120 are cast into piston crown 72 of piston 74. As the raised targets 120 come into close proximity to coil 88, the raised targets 120 are heated and initiate combustion when the requisite temperature is obtained. By casting a plurality of raised targets 120 on piston crown 72, multiple ignition source combustion is achieved. It is also contemplated that multiple high frequency alternating voltage elements may be installed in the combustion chamber in order to minimize the distance in the combustion chamber to the ignition source.

Figure 14:
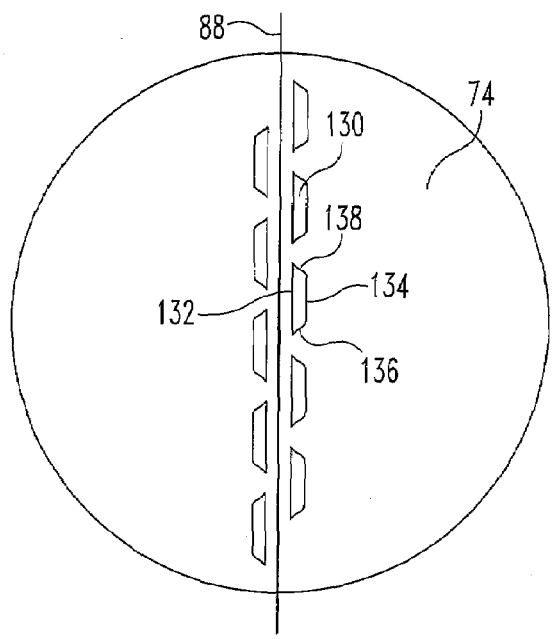
FIG. 14 is a top plan view of another alternative piston crown design.
Figure 15:
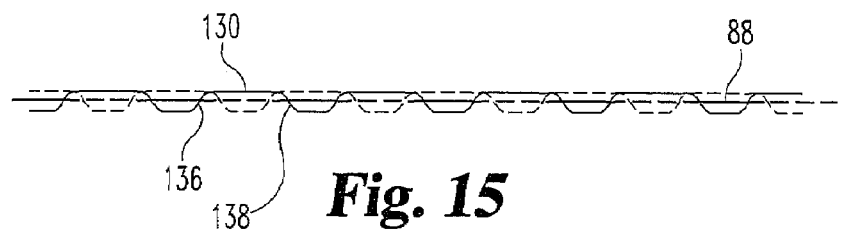
FIG. 15 is a partial side elevation view of the alternative piston crown design of FIG. 14.

FIGS. 14-15 illustrate yet another embodiment of features potentially cast into the top surface of piston 74. In this embodiment, a series of raised ridges 130 are configured to straddle coil 88 when piston 74 is at or near top dead center. As shown, the raised ridges 130 are offset from each other relative to coil 88. While a completely offset design is illustrated in FIG. 15, it is noted that within the scope of this disclosure, various offsets are possible. Different offsets may be sought depending on the particular heat rise and timing desired.

Figure 16:
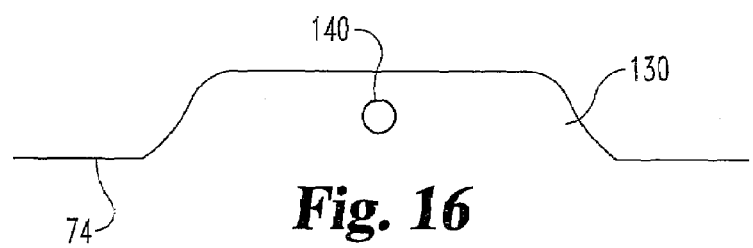
FIG. 16 is a partial side elevation view of an alternative design of the ridges shown in FIG. 14.

It is also depicted in FIG. 14 that raised ridges 130 have side surfaces 132 and 134 that are parallel to coil 88. Further, raised ridges 130 also have tapered edges 136 and 138, thereby increasing the number of edged surfaces entering the electromagnetic field. It should be noted that the raised ridges 130 depicted in FIG. 14 are not to scale relative piston 74. The size of the ridges 130 is exaggerated to clearly show the tapered design. FIG. 16 illustrates a further feature that could be incorporated into the raised ridge 130 design. In this embodiment, a hole 140 is placed in or near the center of raised ridge 130, thereby incorporating more edges into raised ridge 130. The purpose of these edges is to facilitate quicker heat rise. Though tapered edges 136 and 138 and hole 140 are the only configurations shown, other configurations are contemplated and within the spirit of the invention. The embodiments shown in FIGS. 10-16 use the features cast into the top of the piston 74 as the electromagnetic load and, in that context, the features need to have a ferrous component so that they are able to react to the electromagnetic field produced from the high frequency current supplied to coil 88.

Figure 17:
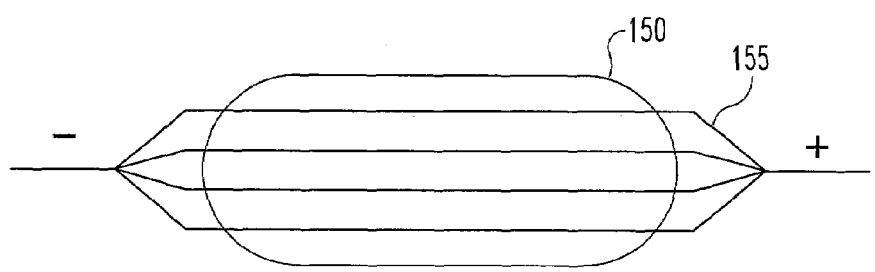
FIG. 17 is a top plan view of oval piston for use with an ignition initiation system of the present disclosure.

FIG. 17 illustrates piston 150 having an oval shape. Such a configuration requires that a longer linear magnetic element 155 be used. The oval shape of piston 150 allows the distance between the combustion chamber and the magnetic element 155 to be minimized. Additionally, the oval shape creates a larger compression area in the combustion chamber, resulting in slower burning fuels to be used in spite of their slower flame front propagation characteristics.

Figure 18:
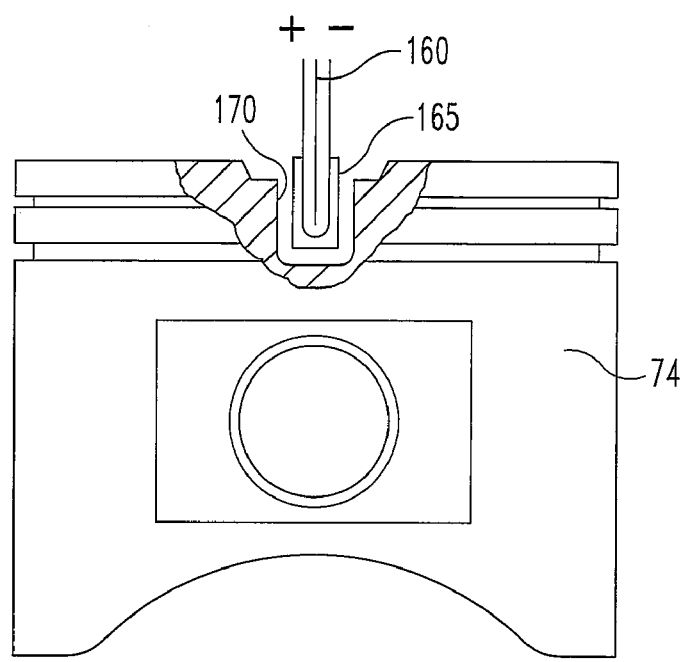
FIG. 18 is a side elevation view of the inductive preheating system of the present invention.
Figure 19:
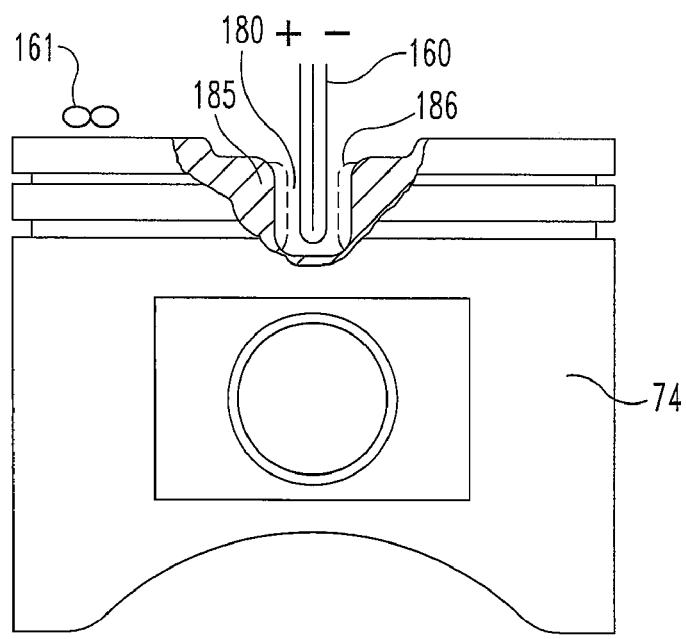
FIG. 19 is a side elevation view of an alternative inductive preheating system.
Figure 20:
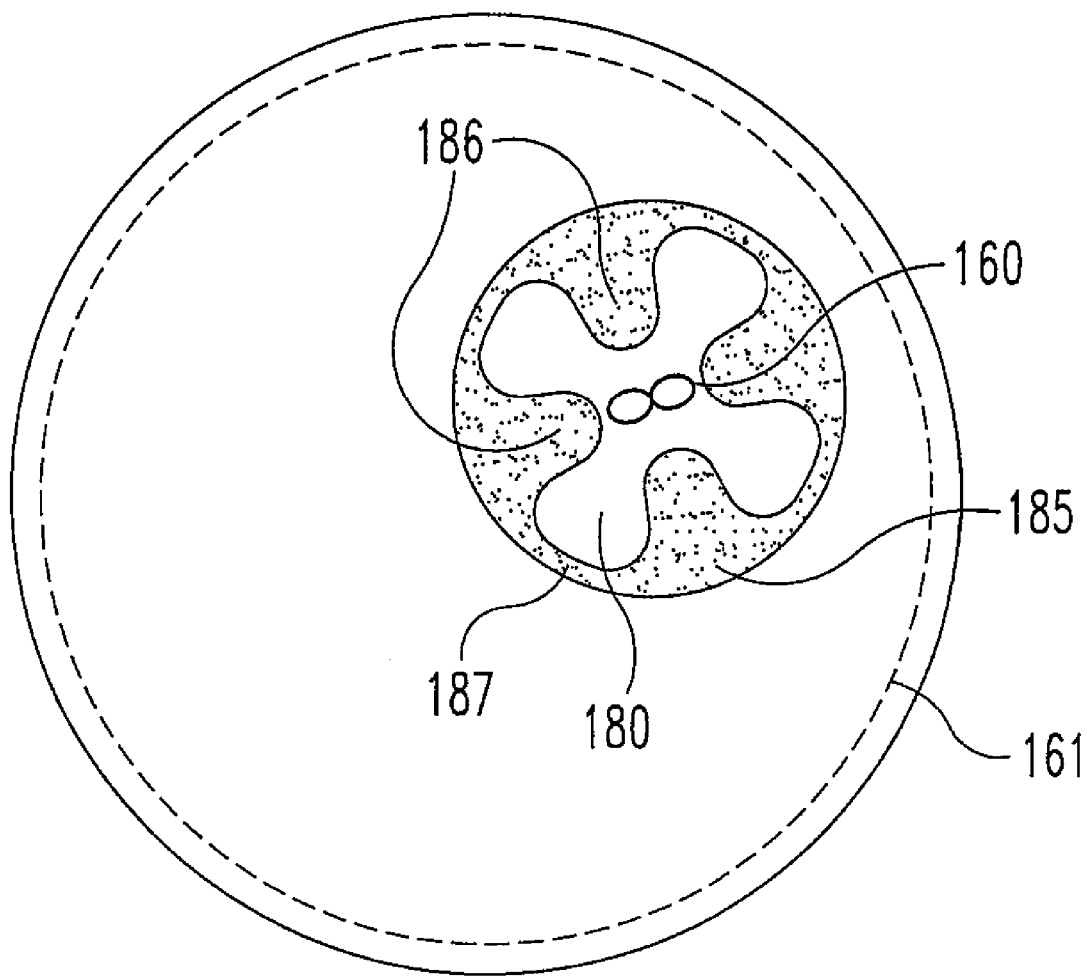
FIG. 20 is a top plan view of the alternative inductive preheating system of FIG. 19.

Other uses of inductive heating may also be incorporated in combustion engines. FIGS. 18-20 illustrate such an alternative use. Traditionally, glow plugs are used in diesel engines in cold weather conditions to heat the engine block. However, inductive heating may be incorporated to heat the piston surface and surfaces surrounding the combustion chamber so that the compressive heat generated in the upstroke of the piston is more capable of combusting the fuel. As illustrated in FIG. 18, a conductive element 160 is surrounded by a heating element 165. As current is induced through conductive element 160, a significant temperature rise is generated within the heating element 165. The high current density and low mass generates a highly focused magnetic edge effect, which propagates the heating of heating element 165.

Located within the upper surface of piston 74 is a well 170. Well 170 is adapted to receive the conductive element 160 and heating element 165 combination when piston 74 is at or near top dead center. By using inductive heating instead of a resistive element, much faster heat rise times can be obtained, thereby allowing a diesel engine to be started sooner and with less damage being done to the cylinder block and cylinder head.

FIGS. 19-20 illustrate an alternative embodiment to the configuration of FIG. 18. In this embodiment, well 180 is located within the upper surface of piston 74 and well 180 is adapted to receive conductive element 160 when the piston 74 is at or near top dead center. Seated within well 180 is a heating liner 185. Heating liner 185 has a curved inner surface defining a plurality of heating lands 186. Adjacent to heating lands 186 are recessed regions 187. In this context, heating liner 185 has a ferrous component so that it will react to the high frequency current supplied to conductive element 160. As high frequency current runs through conductive element 160 and piston 74 nears top dead center, heating liner 185 reacts to the electromagnetic field produced causing a significant rise in temperature.

Also shown in FIGS. 19-20 is conductive ring element 161. Conductive ring element 161 is depicted along with conductive element 160 for illustrative purposes only. It is preferred that either conductive element 160 or conductive ring element 161 is to be used, but not both simultaneously. Conductive ring element 161 operates similar to the other embodiments described above. When conductive ring element 161 is utilized, the crown of piston 74 needs to have a ferrous component because it is the crown of piston 74 that reacts with conductive ring element 161. In this embodiment, as piston 74 is at or near top dead center, piston 74 begins to heat up due to the induction of surface currents from the electromagnetic field generated by conductive ring element 161. In the embodiments shown in FIGS. 18-20, virtually instantaneous starts of cold diesel engines are made possible. Start times of 0.010 second are contemplated.

Figure 21:
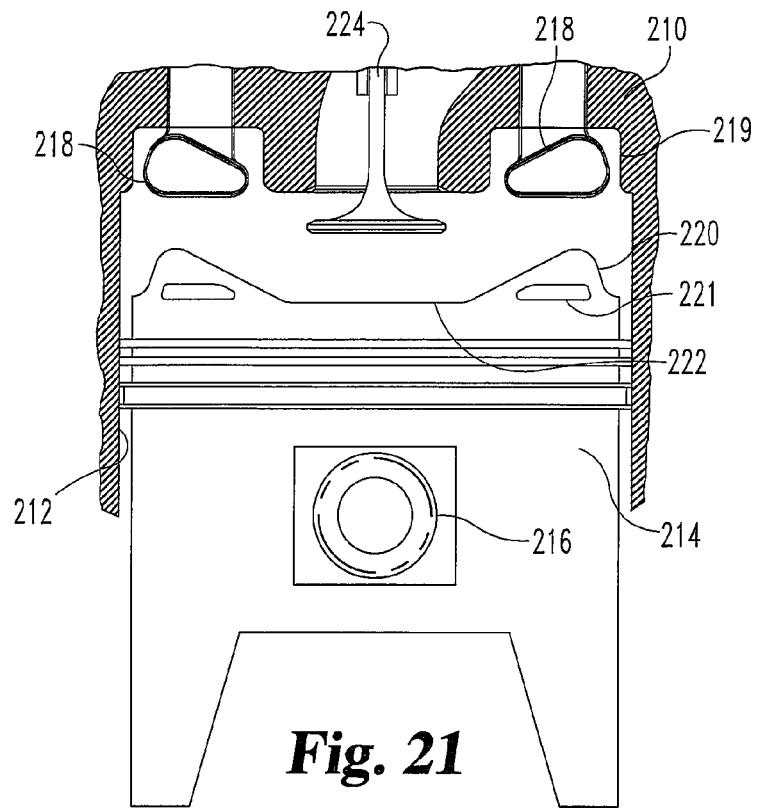
FIG. 21 is a front elevation view in partial section of an alternative ignition initiation system.
Figure 22:
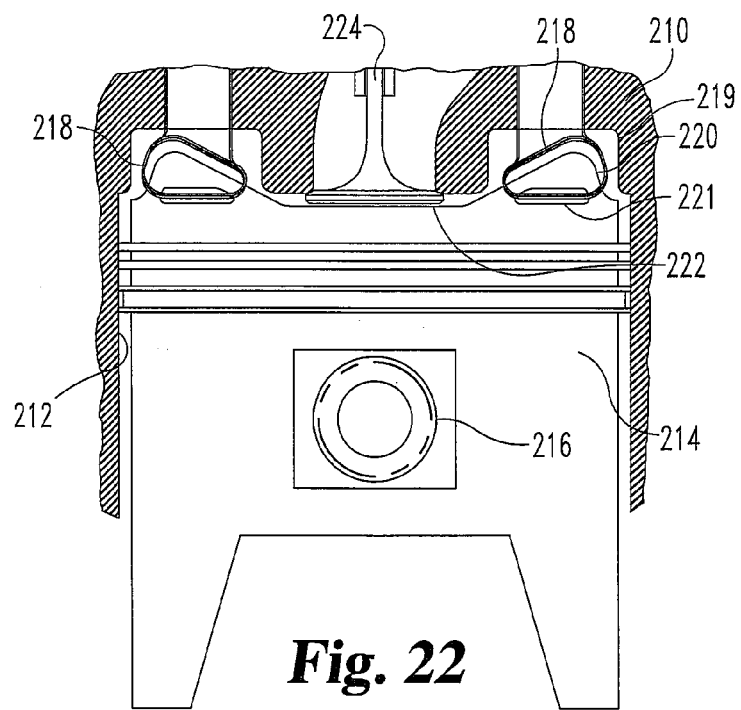
FIG. 22 is a front elevation view in partial section of the system shown in FIG. 21 in which the piston is in a raised position.

FIGS. 21 and 22 show an alternative configuration to that shown in FIGS. 4 and 5. In FIG. 21 a piston 214 is displaceable in a cylinder 212 to form a combustion chamber relative to head 210. Piston 214 is reciprocal so that it translates linear movement through a wrist pin 216 to a crank shaft (not shown) to produce rotary output. In the embodiment shown, valve 224 is provided into head 210 to allow either the entry of a combustible mixture and/or exhaust of the mixture so ignited. Head 210 has various current conducting elements 218 through which a high frequency electrical voltage is passed. Furthermore, the electrically conductive elements 218 are electrically insulated and thermally insulated from the other elements of head 210. These conductive elements 218 are substantially disposed within slots 219 cut located within head 210.

Piston 214 has a plurality of raised elements 220 on its crown 222. Raised elements 220 correspond with the slots 219, such that slots 219 can receive raised elements 220 when the piston 214 is in a raised position (see FIG. 22). In the embodiment shown, the height of raised element 220 above crown 222 is directly related to its radial distance from center. Raised elements 220 have holes 221 which extend along the radial length of raised elements 220. These holes 221 allow for a quicker heat rise time to result in raised element 220 when exposed to the electrical magnetic field produced by conductive element 218. Again, this is due to the low mass and high current density on the surfaces of raised element 220.

Again, FIG. 22 illustrates this version of the ignition initiation system in which piston 214 is in a raised position. When piston 214 is in such position, valve 224 is closed. As previously discussed, raised elements 220 are received by slots 219 within head 210. As should be apparent to those of ordinary skill, conducting elements 218 create an electrical magnetic field normal to the plane of the conducting elements 218. Therefore, raised elements 220 move in the direction perpendicular to the generated field. This allows for the introduction of a further determinable variable: time. Particularly, the time in which raised element 220 is present within, and therefore electrically and thermally affected by, the field generated by conducting element 218. In this embodiment, only when piston 214 is at or near top dead center do raised elements 220 due to the induction of surface currents from the electromagnetic fields generated by conducting elements 218. Therefore, in addition to providing another manufacturing and design option, the embodiment illustrated in FIGS. 21 and 22 assure that ignition will occur within the combustion area (the space between and around piston crown 222 and head 210) at or near top dead center.

Figure 23:
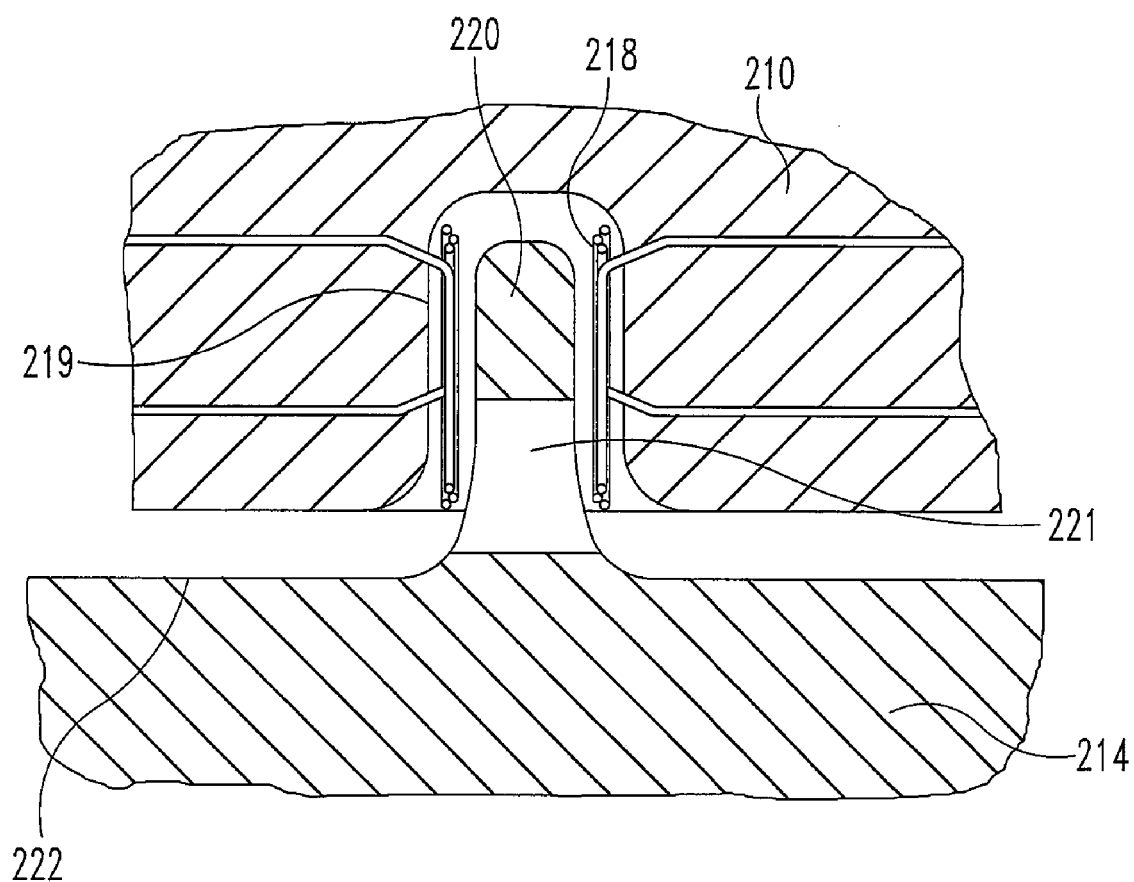
FIG. 23 is a cross-sectional view of the system shown in FIG. 22.

As shown in FIG. 23, conductive elements 218 may be provided on both sides of raised elements 220 as shown. When piston 214 is in its raised position, raised element 220 is substantially disposed within slot 219. The close proximity of the edges of raised element 220 to conductive elements 218, as well as the predictable entry of raised element 220 into the field generated by conductive elements 218, results in a predictable rise time in thermal heat of raised element 220. As apparent in FIG. 23, hole 221 may be bisected by the lower edges of conducting elements 218. As shown, hole 221 of raised element 220 substantially enters the field generated by conductive elements 218. Again, this results in an increased thermal rise time of raised element 220.

Figure 24:
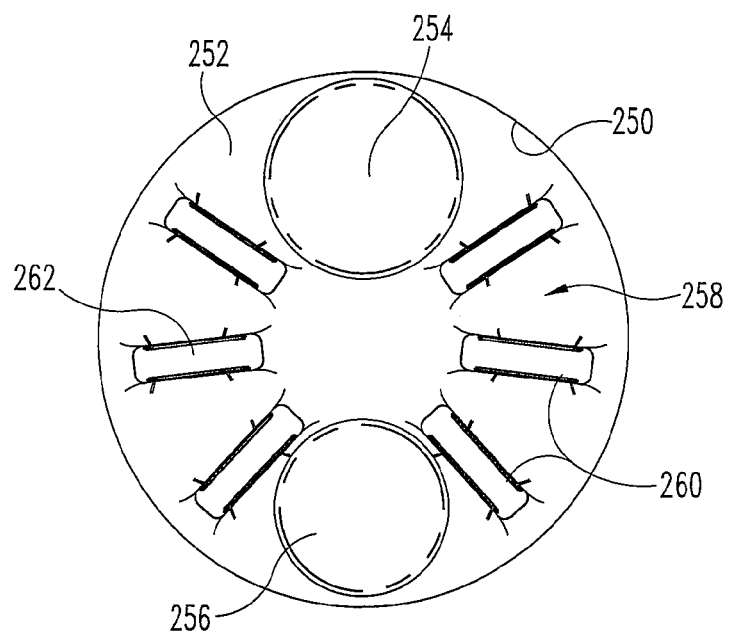
FIG. 24 is a top plan view of an engine combustion chamber incorporating another embodiment of an ignition initiation system.

FIG. 24 shows an example of a typical combustion chamber configuration in which chamber 250 is defined by a cylinder head 252 having an intake valve 254 and an exhaust valve 256 to respectively admit a combustible mixture into exhaust the motive fluid after the mixture has gone through combustion. Combustion is initiated by induction driven combustion initiator generally indicated by reference number 258. In this embodiment, the combustion initiator 258 comprises a series of conducting elements 260 disposed within a series of slots 262 within cylinder head 252.

Figure 25:
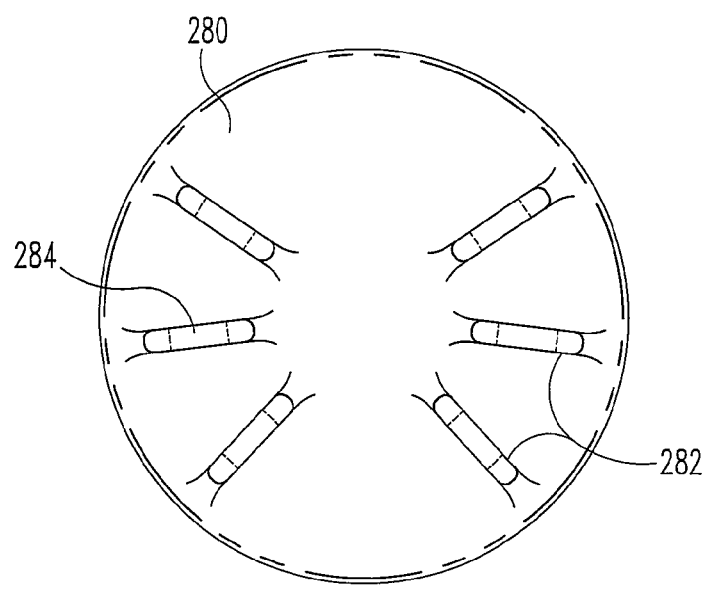
FIG. 25 is a top plan view of a piston incorporating another embodiment of an ignition initiation system.

FIG. 25 shows an example of a typical piston head design to be used with the combustion chamber configuration of FIG. 21. In this embodiment, piston head 280 includes a series of raised elements 282 that correspond to slots 262 within cylinder head 252. Raised elements 282 are sized to be received by slots 262 and pass by, while not contacting, conducting elements 260. As shown, raised elements 282 may include holes 284 that extend along the radial direction of raised elements 282.

Figure 26:
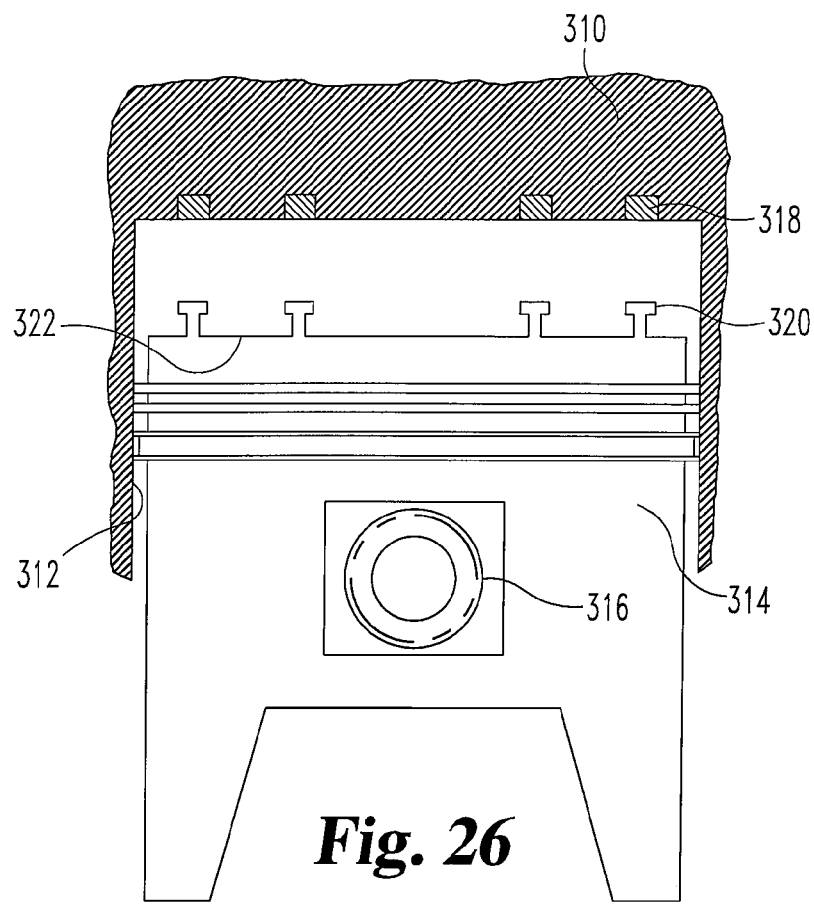
FIG. 26 is a front elevation view in partial section of an alternative ignition initiation system.
Figure 27:
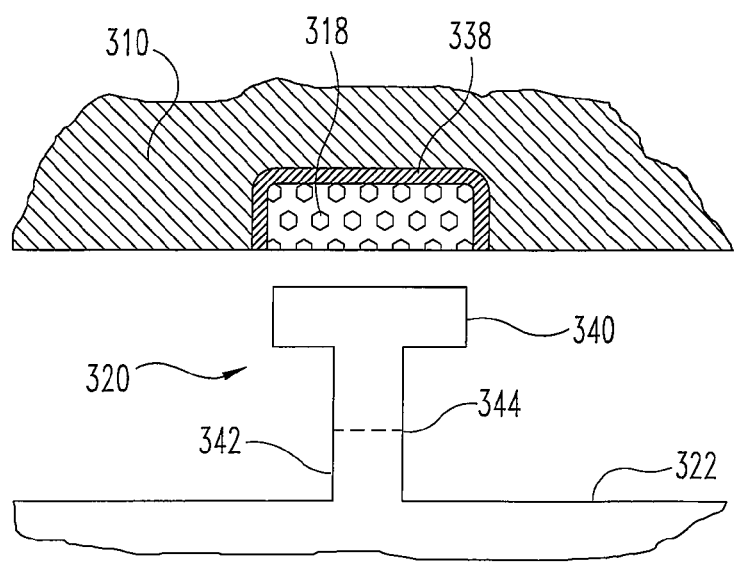
FIG. 27 is a cross sectional view of ignition initiation system of FIG. 26.

FIG. 26 illustrates yet another configuration of the disclosed ignition initiation system. In FIG. 26, a piston 314 is displaceable in a cylinder 312 to form a combustion chamber relative to head 310. Piston 314 is reciprocal so that it translates linear movement through a wrist pin 316 to a crank shaft (not shown) to produce rotary output. In the embodiment shown, conducting element 318 is positioned on or within the lower surface of head 310. Like the current conducting elements previously described, a high frequency electrical voltage is passed through current conducting element 318. As shown in greater detail in FIG. 27, conducting element 318 is electrically insulated and thermally insulated from the other elements of head 210 by insulator 338. Insulator 338 can function to both electrically and thermally insulate conducting element 318 from head 310, as well as concentrate the electromagnetic field generated by conducting element 318 when it is connected to an operating high frequency current generator. In the embodiment shown, conducting element 318 may consist of a single element connected to a high frequency current generator. Alternatively, conducting element 318 may consist of a plurality of conducting elements placed within head 310.

Figure 28:
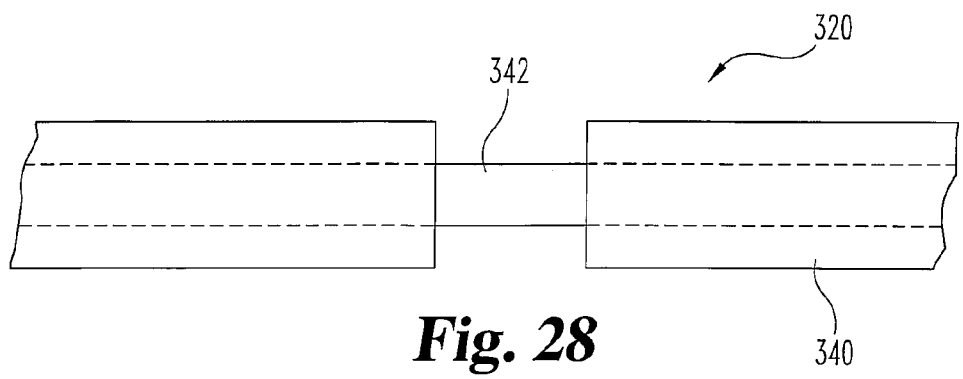
FIG. 28 is an elevation view of the raised element design of FIG. 26.
Figure 29:
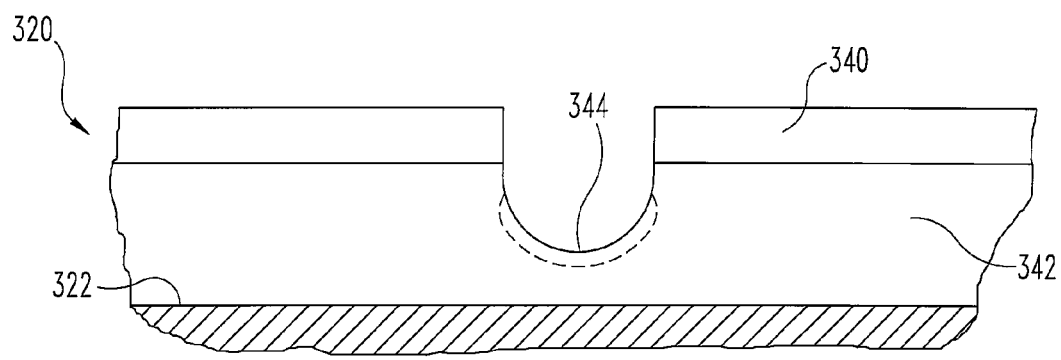
FIG. 29 is a side view of the raised element design of FIG. 26.

Piston 314 has a plurality of raised elements 320 on its crown 322. The radial position of raised elements 320 correspond to the positions of conducting element 318 within head 310. As shown in more detail in FIGS. 27, 28 and 29, raised element 320 consists of a support portion 342 connected or cast into crown 322. Top portion 340 is connected to support portion 342. In the embodiment shown, top portion 340 has a greater surface area facing conducting element 318 than support portion 342. The dotted line show in FIG. 27 indicates the bottom of recess 344. As shown in FIG. 29, recesses 344 are located in raised elements 320. Due to the electromagnetic effects on raised element 320, as well as the surface edges defining recess 344, a substantial thermal increase occurs at the valley of recess 344. The dotted portion indicated in FIG. 29 is the location of the quickest thermal increase. As the raised element 320 becomes affected by the electromagnetic field produced, currents begin to run on its surfaces. As the surface area exposed to the field is reduced (i.e., mass taken away), the surface current density is substantially increased near the edges of the void. Thus, there is a substantial spike in heating at this location resulting in a reduced time in which it takes to ignite the fuel within the combustion chamber.

Figure 30:
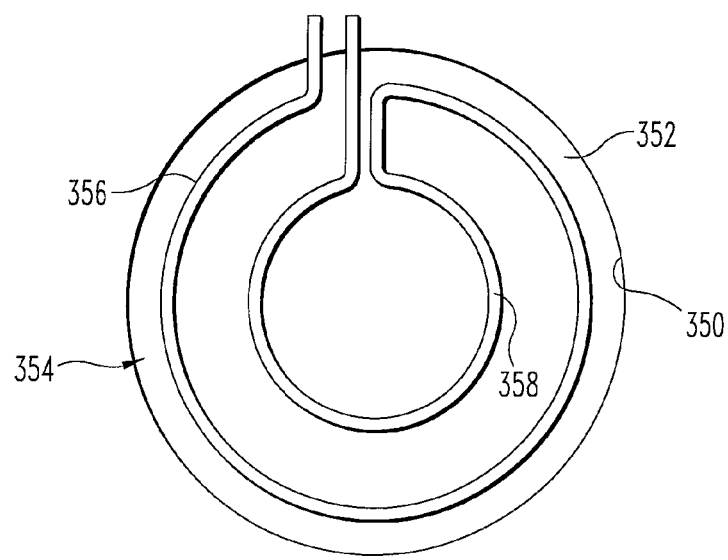
FIG. 30 is a top plan view of an engine combustion chamber incorporating another embodiment of an ignition initiation system.

FIG. 30 shows an example of a typical combustion chamber configuration in which chamber 350 is defined by a cylinder head 352. Combustion is initiated by induction driven combustion initiator generally indicated by reference number 354. In this embodiment, the combustion initiator 354 comprises a single conducting element geometrically arranged to create an outer coil 356 and inner coil 358 disposed within cylinder head 352.

Figure 31:
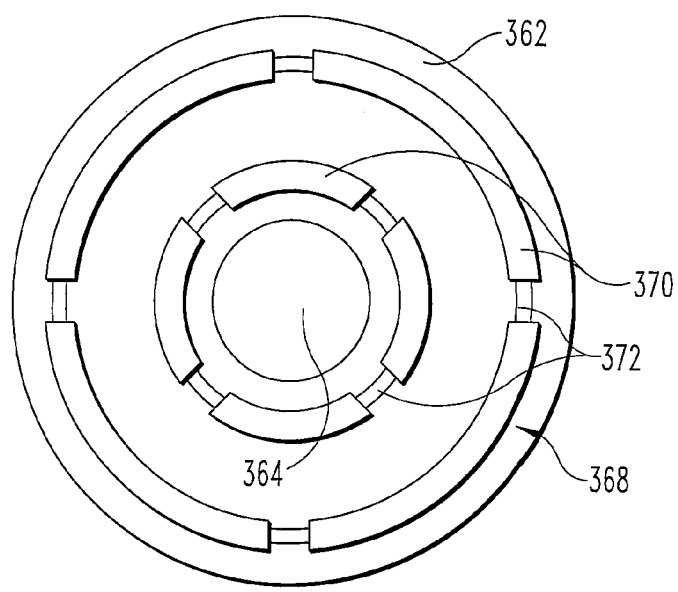
FIG. 31 is a top plan view of a piston incorporating another embodiment of an ignition initiation system.

FIG. 31 shows an example of a typical piston head design to be used with the combustion chamber configuration of FIG. 30. In this embodiment, piston head 362 includes two raised elements, generally indicated by reference numeral 368, and an exhaust valve 364. Each raised element 368 corresponds to the combustion initiator 354 design within cylinder lead 352. Each raised element includes a top portion 370 and recess 372. As piston head 362 travels toward cylinder head 352 and combustion initiator 354 is connected to a high frequency current generator, the electromagnetic field produced by combustion initiator 354 induces surface currents on raised elements 368. Because of electromagnetic effects, the electromagnetic field tends to concentrate in those locations of absent mass. Therefore, the quickest thermal increase occurs in recesses 372. As such, in the embodiment shown, the combustion chamber between cylinder head 352 and piston 362 would have at least eight (8) separate combustion initiation points. As described above, multiple combustion initiation points allow for more efficient combustion engines.

Figure 32:
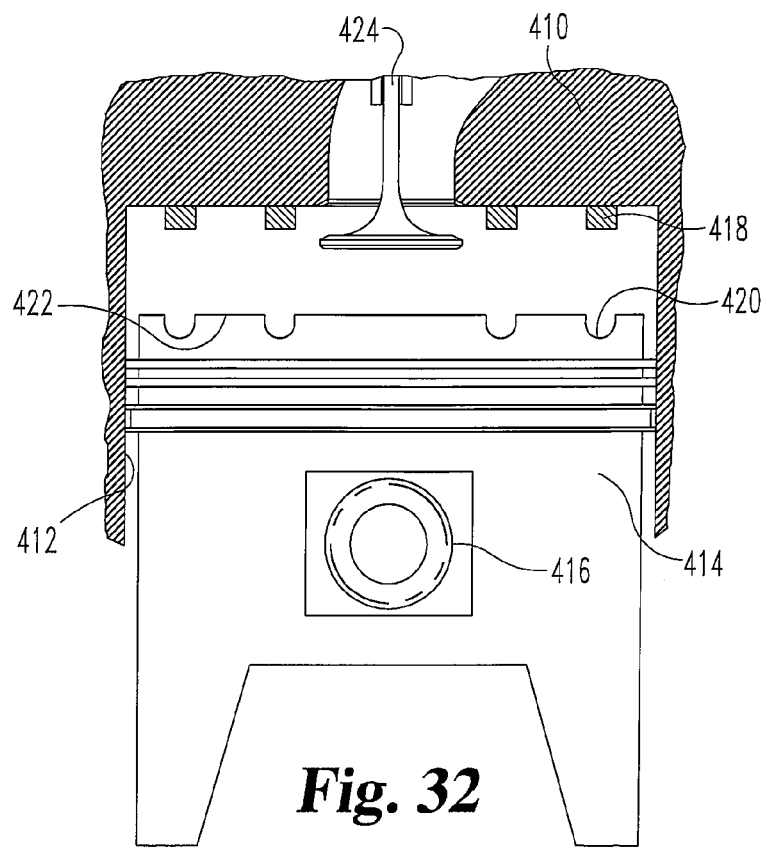
FIG. 32 is a front elevation view in partial section of an alternative ignition initiation system.

FIG. 32 shows an alternative configuration of the induction initiation system of the disclosure. As shown, a piston 414 is displaceable in a cylinder 412 to form a combustion chamber relative to head 410. Piston 414 is reciprocal so that it translates linear movement through a wrist pin 416 to a crank shaft (not shown) to produce rotary output. In the embodiment shown, valve 424 is provided into head 410 to allow either the entry of a combustible mixture and/or exhaust of the mixture so ignited. Head 410 has various current conducting elements 418 through which a high frequency electrical voltage is passed. Furthermore, the electrically conductive elements 418 are electrically insulated and thermally insulated from the other elements of head 410. These conductive elements 418 are located on the bottom surface of head 410 within the combustion area.

Piston 414 has a plurality of recesses 420 on its crown 422. The location of recesses 420 correspond with the placement of conductive elements. Recesses 420 allow for easier manufacture of piston 414 to incorporate the inductive ignition of the present disclosure. As discussed hereinabove, the absence of mass at the recesses 420 caused the electromagnetic field produced by conductive elements 418 to focus on these locations, which causes a thermal rise due to the induced surface currents.

The use of induction heating has been employed for many years to obtain rapid heating of industrial components for subsequent processing and heat treating functions. One of the attributes of such a system is that it can elevate the temperature of selected components in extremely short periods of time. A second attribute is that energy and current flow take place only in the close proximity to electromagnetic load.

As stated previously, this invention utilizes extremely rapid heating of materials by induction heating to produce a series of controlled hot locations within a combustion chamber to produce uniform initiation of combustion throughout a combustion chamber.

While the preferred embodiment of the invention has been illustrated and described in the drawings and foregoing description, the same is to be considered as illustrative and not restrictive in character, it being understood that all changes and modifications that come within the spirit of the invention are desired to be protected.

What is claimed is:

1. An induction driven ignition system in cooperation with a power source to be used within a reciprocating internal combustion engine having a piston, cylinder head and combustion chamber, the induction driven ignition system comprising:
   a cylinder head slot located within said cylinder head;
   a conducting element located within said cylinder head slot, said conducting element electrically connected to said power source; and
   a raised element located on the upper surface of said piston, said raised element cooperating with said cylinder head slot, wherein conducting element inductively interacts with said raised element when said power source supplies current to said conducting element and said one raised element is positioned within said cylinder head slot.

2. The induction driven ignition system of claim 1, wherein said conducting element has a coil configuration.

3. The induction driven ignition system of claim 2, wherein said coil configuration defines a first plane, wherein said raised element moves in a direction substantially parallel to said first plane when said piston is reciprocated.

4. The induction driven ignition system of claim 1, wherein said slot houses a pair of directly opposed conducting elements.

5. The induction driven ignition system of claim 1, wherein said raised element includes a hole.

6. The induction driven ignition system of claim 5, wherein said hole extends along said raised element in a radial direction relative to said piston.

7. An induction driven ignition system in cooperation with a power source to be used within a reciprocating internal combustion engine, the induction driven ignition system comprising:
   a first engine element, said first engine element constructed and arranged to travel substantially in a first direction;

a second engine element;

a combustion chamber located between said first engine element and said second engine element; and induction means to generate an electromagnetic field, said electromagnetic field having an orientation substantially in a second direction, wherein said induction means inductively interacts with said first engine element when said power source supplies current to said induction means.

8. The induction driven ignition system of claim 7, wherein said second direction is substantially parallel to said first direction.

9. The induction driven ignition system of claim 7, wherein said second direction is substantially perpendicular to said first direction.

10. An induction driven ignition system in cooperation with a power source to be used within a reciprocating internal combustion engine having a piston, cylinder head, cylinder chamber and combustion chamber, the induction driven ignition system comprising:

a conduction coil located within said cylinder head, said conduction coil electrically connected to said power source; and a raised element located on an upper surface of said piston, said raised element corresponding to the shape of said conduction coil, wherein said conduction coil inductively interacts with said raised element when said power source supplies current to said conduction coil and said raised element comes in close proximity to said conduction coil.

11. The induction driven ignition system of claim 10, wherein said raised element consists of a top portion and a support portion, said support portion connected to said upper surface of said piston.

12. The induction driven ignition system of claim 11, wherein said support portion has a first thickness in the radial direction from the geometric center of said piston, said top portion has a second thickness in the radial direction of said geometric center.

13. The induction driven ignition system of claim 12, wherein said second thickness is larger than said first thickness.

14. The induction driven ignition system of claim 11, wherein said raised element has a recess, said recess extending from said top portion into said support portion.

* * * * *